(No Model.) 4 Sheets—Sheet 1.

S. WASHINGTON.
MOLD FOR MAKING GLASS BOTTLES OR LIKE ARTICLES.

No. 424,524. Patented Apr. 1, 1890.

Attest:
O. S. McArthur
A. E. Hansmann.

Inventor:
Samuel Washington,
By Foster & Freeman
attys.

(No Model.) 4 Sheets—Sheet 2.

S. WASHINGTON.
MOLD FOR MAKING GLASS BOTTLES OR LIKE ARTICLES.

No. 424,524. Patented Apr. 1, 1890.

Attest:
W. S. McArthur
A. E. J. Hausmann

Inventor:
Samuel Washington,
By Foster & Freeman
attys.

(No Model.) 4 Sheets—Sheet 3.
S. WASHINGTON.
MOLD FOR MAKING GLASS BOTTLES OR LIKE ARTICLES.
No. 424,524. Patented Apr. 1, 1890.
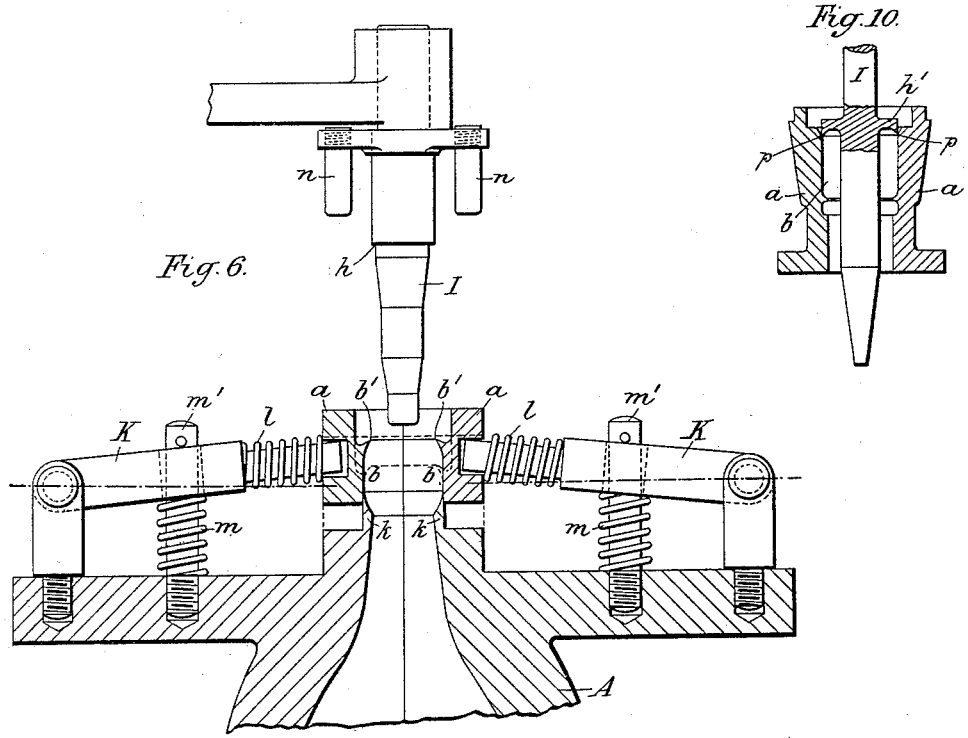
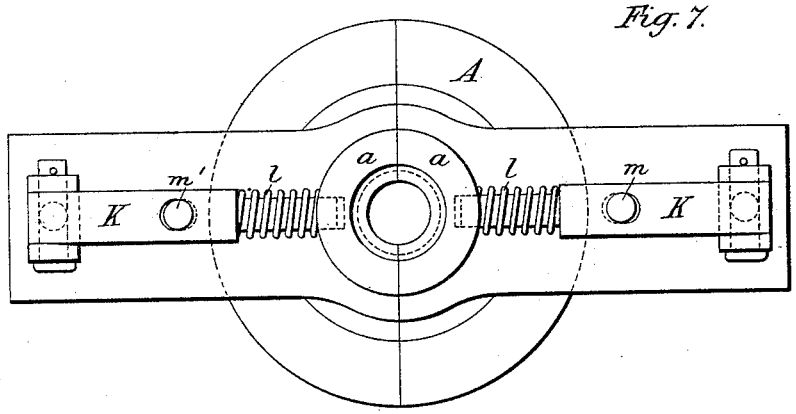

(No Model.)  4 Sheets—Sheet 4.

S. WASHINGTON.
MOLD FOR MAKING GLASS BOTTLES OR LIKE ARTICLES.

No. 424,524. Patented Apr. 1, 1890.

Attest:
H. S. McArthur
A. E. F. Hansmann

Inventor:
Samuel Washington,
By Foster & Freeman
atty.

UNITED STATES PATENT OFFICE.

SAMUEL WASHINGTON, OF MANCHESTER, ENGLAND.

MOLD FOR MAKING GLASS BOTTLES OR LIKE ARTICLES.

SPECIFICATION forming part of Letters Patent No. 424,524, dated April 1, 1890.

Application filed August 6, 1889. Serial No. 319,944. (No model.)

*To all whom it may concern:*

Be it known that I, SAMUEL WASHINGTON, a subject of Her Majesty the Queen of Great Britain, residing at Oaklands, Harphurhey, Manchester, England, have invented certain new and useful Improvements in Molds for Making Glass Bottles or Like Articles, of which the following is a specification.

This invention relates to the manufacture of glass bottles; and it consists in part of further improvements based on my former invention described in the specification of an application filed on the 8th of April, 1889, Serial No. 306,382.

The object of the invention is to make at one operation a bottle having a finished neck.

By this invention the mold in which the bottles are formed is made with a neck longer than the neck of the bottle intended to be made. The upper part of the neck of the said mold, which part I call the "collar," may be separate and detachable and made in such manner as to lie closely upon the mold and form a continuation of the neck of the same. The said collar may be made in two or more sections, and, if separate, may be made compressible and may be attached to the mold by springs. For the purpose of shaping the neck of the bottle grooves or recesses of any desired form may be made in any required part of the collar or of the neck of the mold. A bottle having been blown in the mold in the customary manner, the neck of the bottle is shaped in it by the pressure of a suitable die or of the collar of the mold, or of both combined, while the glass is still plastic.

To clearly explain the nature of my invention, reference is made to the accompanying drawings, in which—

Figure 1:
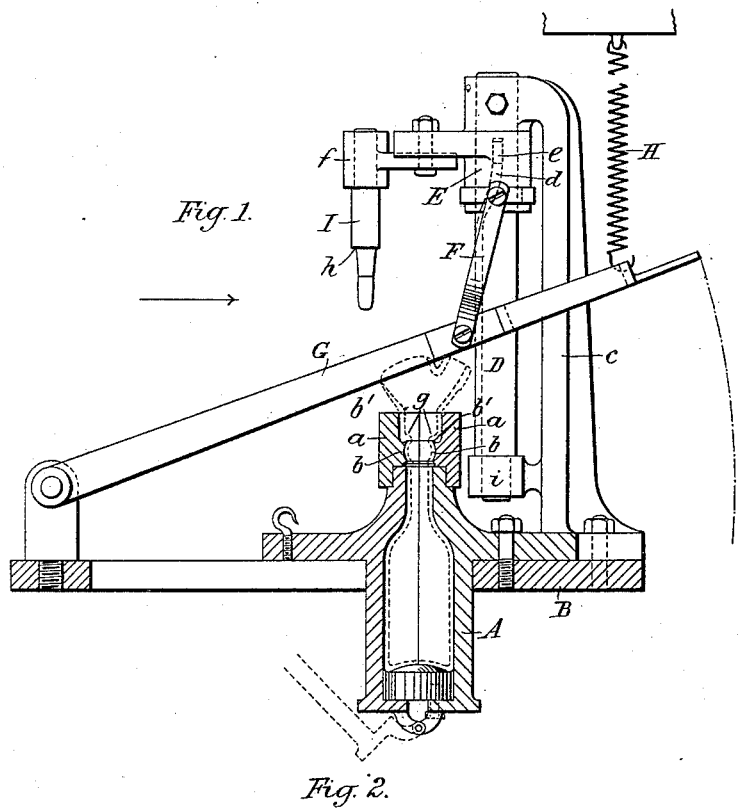
Figure 2:
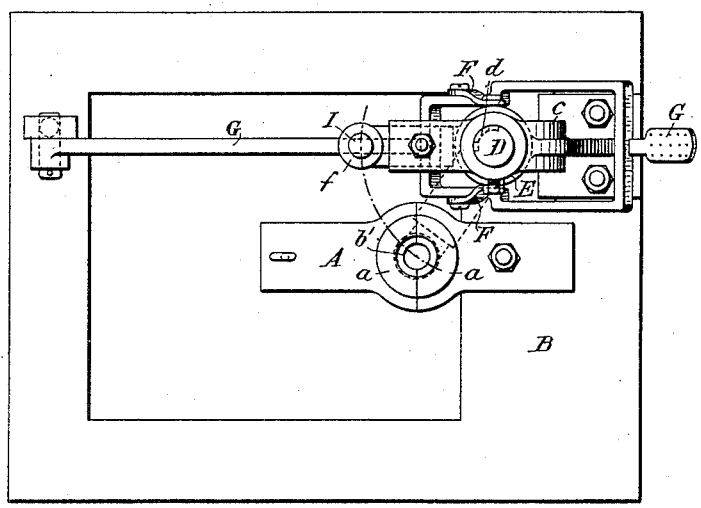
Figure 3:
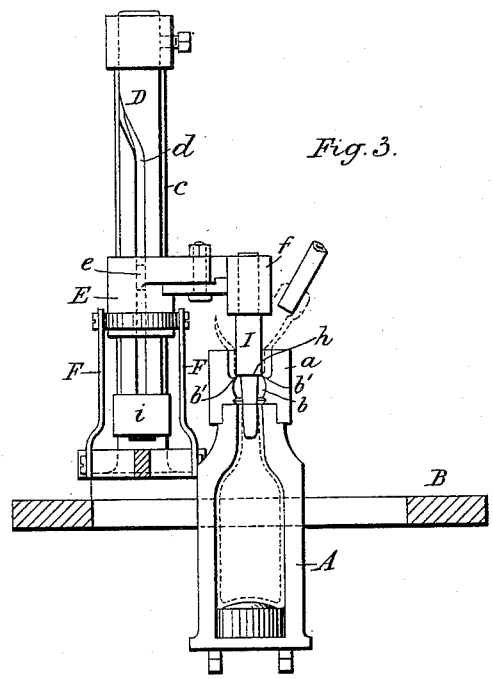
Figure 4:
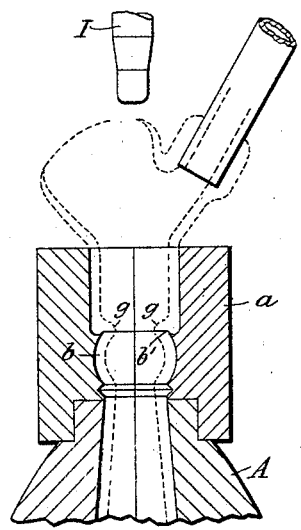
Figure 5:
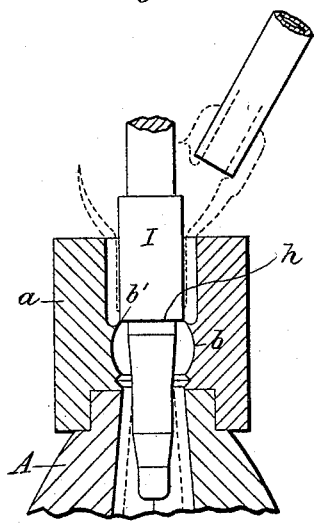
Figure 8:
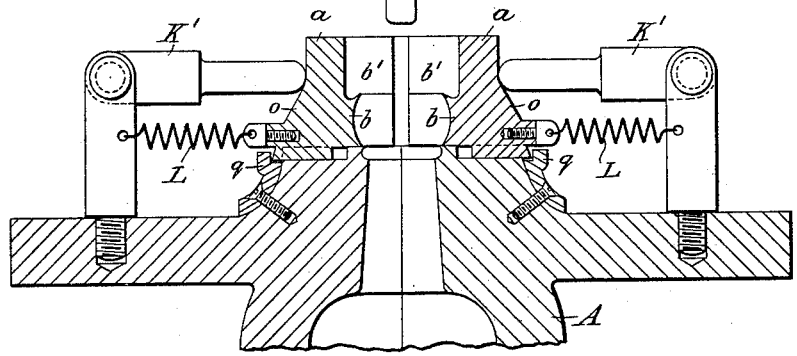
Figure 9:
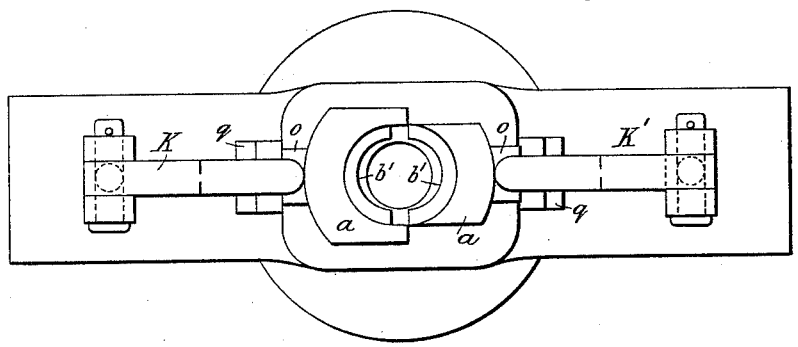

Figure 1 is a sectional elevation of an ordinary bottle-mold having my improvements applied thereto. Fig. 2 is a plan view of same. Fig. 3 is a view looking at one face of the divided mold in the direction shown by the arrow in Fig. 1. Figs. 4 and 5 are enlarged views of a portion of a mold with collar and die or plunger, showing the manner in which the neck or head is formed after the glass is blown. Fig. 6 is a sectional elevation of a portion of a mold having what I term a "compressible collar" thereon, showing also the die or plunger. Fig. 7 is a plan view of the mold and collar portion only. Fig. 8 is a sectional elevation of a portion of a mold having another form of compressible collar and showing the die or plunger. Fig. 9 is a plan view of the mold and collar portion only. Fig. 10 shows in section a collar portion and a modified form of die or plunger.

A is the ordinary bottle-mold, formed in sections hinged together, one of them being secured to a bed-plate B by a bolt or set-screw passing through an arm of same, as shown, the corresponding arm on the other half carrying a hook to which a cord may be attached for the blower to operate in the usual way to close the mold. Each section of the mold A carries a section of collar $a$ $a$, forming an extension of the neck of same, inside of which (or partly inside of which and partly inside of the neck of the mold, as shown in Fig. 8) are formed grooves $b$ of the shape which it is desired to give to the mouth, lip, or flange of the bottle, the top groove forming a sharp projection or cutting-edge $b'$, as shown, upon which the glass is severed. This cutting projection $b'$ is in the form of an annular upward and inward projecting knife-edge, and thus insures a clean sharp severing of the glass as the plunger is forced past it. Above these grooves the collar forms such an extension of the neck as to prevent the too rapid cooling of the glass at those parts, so leaving it hot and in condition to be pressed into shape. Attached to the bed-plate B is a standard $c$, carrying a vertical shaft D, in which is a groove $d$, straight for some distance but turning obliquely at the upper end. On this shaft is a block E, a feather $e$ on which engages with the groove $d$. To an arm on the block E a die or plunger holder $f$ is bolted. Attached to either side of the block E are link-pieces F, the other ends of which are connected to a pivoted treadle-lever G, which is formed, as shown, so as to embrace the standard $c$ and connected parts. To hold this lever normally up, a spring H is connected to it and to some overhead part. As the treadle G is forced down the block E has a partial turn given to it, owing to the engagement of its feather $e$ with the groove $d$, and is brought from the position shown in Figs. 1 and 2 into the position shown in dotted lines in Fig. 2, bringing the die or plunger I directly over the opening of the mold and down into same, as shown in Fig. 3, to a limited extent. The object of giving this turn to the die or plunger I is to permit it when carried up to be held out of the way of the mold-opening for the purpose of enabling the blower to insert his blow-pipe and parison into the mold, as also to leave a free space for the removal of the finished bottle.

In Figs. 4 and 5 are shown clearly the manner in which I produce the finished neck, the entire operation of forming the bottle being as follows: The blower having inserted the parison in the open mold, by means of his blow-pipe closes same and proceeds to blow until he brings his pipe with the superfluous metal outside of the collar, as shown in Fig. 4, bursting an opening in this portion of the metal. By then operating the treadle with his foot he brings the die or plunger I down into the neck of the mold. The die or plunger, which is slightly tapered in shape, collects the glass which has formed the shoulder $g$ around the cutting-edge $b'$ and forces it down into the part $b$, which it fills, while the flat part $h$ of the die or plunger, coming against the cutting-edge $b'$, cuts off and completes the bottle-neck, as shown in Fig. 5. The glass being compressed by the die or plunger forms the smooth interior to the neck required for the insertion of the cork.

In Figs. 6 and 7 is shown a compressible collar such as described in an application filed by me on the 8th day of April, 1889, under Serial No. 306,382. In this it will be seen that the collar $a$, which is necessarily in sections, slides upon the neck portion $k$ of the mold A, each section being held in contact therewith by the springs $l\ l$ on the pivoted arms K K. Both portions of the collar are held normally in the raised position shown by the springs $m\ m$ on the posts $m'\ m'$, which pass through the arms K K. The die or plunger I in this case carries two arms $n\ n$, which as the die descends press upon the two halves of the collar and force it down, the shoulder $h$ cutting off the superfluous glass by its contact with the edge of the cutter $b'$. In this way the finished and compressed neck is formed, partly by the forcing down of a portion of the glass by the die or plunger I, as before described, and partly by the compression of the glass which occupies the space in the groove $b$.

In Fig. 8 the collar-sections $a\ a$ are compressible in another direction, (i. e., laterally.) As shown, when open they form a sort of oval shape with one portion constructed to partly enter the other until, when closed, they form a perfect circle. Each collar-section slides on its corresponding section of the mold A, and the sections are kept normally open by the springs L to an extent limited by the stop-pieces $q\ q$. When the die or plunger I descends, the arms $n\ n$ strike the arms K' K' and press them against the inclines $o\ o$ of the collar-sections, thus forcing them in against the action of the spring L and bringing the interior of the collar-sections into the form of a true circle, the effect of which is to compress the glass in the groove $b$ around the plunger I, the cutting off being effected, as before described, by the shoulder $h$ striking the cutting-edge $b'$.

Fig. 10 shows a die or plunger I in which the shoulder $h'$ carries the cutting-edge $p\ p$, which severs the glass and completes the bottle by its contact with the walls of the groove.

It will be evident that many other forms of bottles (or jars) than those shown may be formed in this manner, such as those having lips or flanges internally screwed and other forms of necks, and that many other modifications are possible in the construction of the collar, cutter, and die, those shown being only some of the forms for the purpose of illustrating my invention.

Having now particularly described and ascertained the nature of my said invention and in what manner the same is to be performed, I declare that what I claim is—

1. In combination with a mold, a collar movably mounted upon the mold and provided with an internal cutting-edge and a die or plunger adapted to compress the glass within the collar and having a shoulder to cooperate with the cutting-edge, substantially as described.

2. A glass-mold having a collar of separable parts movable toward each other, in combination, with a die or plunger, cutting devices, and means, substantially such as described, for moving the parts of the collar toward each other, whereby the superfluous glass is cut off and a solid head or neck is compressed around the die or plunger, substantially as described.

3. The combination, with a mold, of a collar formed of two parts mounted upon the mold, means for moving the two parts of the collar toward each other to compress the neck of the article being molded, and a die or plunger adapted to enter the said neck and compress the glass between itself and the collar, substantially as set forth.

4. The combination, with a glass-mold, of a collar for giving shape to the neck or head of the article being molded, formed of two parts mounted upon the mold and held slightly apart by springs, a die or plunger adapted to enter the neck of the article being molded, and the arms $n$, carried by the plunger for moving the parts of the die toward each other to compress the glass as the plunger descends, substantially as set forth.

5. The combination, with the glass-mold, of a plunger movable toward and from the mold, an arm carrying the plunger, a guide on which this arm is supported and movable to carry the plunger toward and from the mold, and mechanism for automatically swinging the arm to one side as the plunger is moving away from the mold, substantially as set forth.

6. The combination, with the glass-mold, of a plunger, an arm carrying the plunger, a guide-shaft on which the arm is supported provided with a curved or bent groove with which engages a projection carried by the said arm, and means for moving the arm along the said shaft, substantially as set forth.

In testimony whereof I have hereunto set my hand in the presence of two subscribing witnesses.

SAMUEL WASHINGTON.

Witnesses:
 PHILIP M. JUSTICE,
 PERCY K. WOODWARD.